United States Patent
Noda et al.

(10) Patent No.: US 6,837,911 B2
(45) Date of Patent: Jan. 4, 2005

(54) CERAMIC-MADE FILTER AND PROCESS FOR PRODUCTION THEREOF

(75) Inventors: Naomi Noda, Ichinomiya (JP); Kanji Yamada, Chita-gun (JP); Yoshiyuki Kasai, Kasugai (JP)

(73) Assignee: NGK Insulators, LTS. (JP)

( * ) Notice: Subject to any disclaimer, the term of this patent is extended or adjusted under 35 U.S.C. 154(b) by 0 days.

(21) Appl. No.: 10/089,795

(22) PCT Filed: Jul. 24, 2001

(86) PCT No.: PCT/JP01/06362

§ 371 (c)(1),
(2), (4) Date: Apr. 23, 2002

(87) PCT Pub. No.: WO02/12687

PCT Pub. Date: Feb. 14, 2002

(65) Prior Publication Data

US 2003/0029142 A1 Feb. 13, 2003

(30) Foreign Application Priority Data

Aug. 8, 2000 (JP) ...................................... 2000-240456

(51) Int. Cl.[7] .............................................. B01D 46/00
(52) U.S. Cl. ......................... 55/282.3; 55/523; 55/524; 55/DIG. 5; 55/DIG. 10; 55/DIG. 30; 60/311; 264/628; 264/630; 264/643; 264/DIG. 48; 156/89.22; 427/244; 427/245; 95/273; 95/278
(58) Field of Search .............................. 55/282.2, 282.3, 55/523, 524, DIG. 5, DIG. 30, DIG. 10; 60/297, 299, 303, 311; 264/628, 630, 631, 643, DIG. 48; 156/89.11, 89.22; 427/243, 244, 245; 428/116, 117, 118; 95/273, 278

(56) References Cited

U.S. PATENT DOCUMENTS

| 5,071,457 | A | * | 12/1991 | Schmidt et al. ................ 55/523 |
| 5,462,907 | A | | 10/1995 | Farrauto et al. ............. 502/304 |
| 5,645,804 | A | | 7/1997 | Sumiya et al. ........... 423/239.1 |
| 6,214,078 | B1 | * | 4/2001 | Way et al. ..................... 55/523 |
| 6,262,322 | B1 | * | 7/2001 | Watanabe et al. ............ 570/211 |
| 6,299,778 | B1 | * | 10/2001 | Penth et al. ................... 55/523 |
| 2002/0011439 | A1 | * | 1/2002 | Blum et al. .................. 427/243 |
| 2002/0157358 | A1 | * | 10/2002 | Noda et al. ................ 55/282.3 |

FOREIGN PATENT DOCUMENTS

| EP | 0 530 734 A1 | * | 8/1992 | .......... B01D/53/36 |
| EP | 0 701 859 A1 | * | 3/1996 | .......... B01D/53/94 |
| JP | 60-1907 | | 1/1985 | |
| JP | 8-84911 | | 4/1996 | |
| JP | 9-220423 | * | 8/1997 | .......... B01D/46/00 |
| JP | 10-45412 | | 2/1998 | |
| JP | 2000-138716 | | 5/2000 | |

* cited by examiner

*Primary Examiner*—Duane Smith
*Assistant Examiner*—Jason M. Greene
(74) *Attorney, Agent, or Firm*—Parkhurst & Wendel, L.L.P.

(57) ABSTRACT

A ceramic-made filter for capturing the particulates present in the exhaust gas discharged from diesel engines, wherein a ceramic particles layer made of heat-resistant ceramic particles is formed on a filter by coating, the heat-resistant ceramic particles having a BET specific surface area of 300 $m^2/g$ or less. In this ceramic-made filter, the melting of the filter caused by the ash remaining and accumulating after the particulates captured by the filter have been burnt, can be prevented easily without using a large system or the like.

18 Claims, 1 Drawing Sheet

US 6,837,911 B2

CERAMIC-MADE FILTER AND PROCESS FOR PRODUCTION THEREOF

TECHNICAL FIELD

The present invention relates to a ceramic-made filter used for capturing the particulates present in the exhaust gas discharged from diesel engines, as well as to a process for production thereof.

BACKGROUND ART

The exhaust gases discharged from diesel engines contain a large amount of particulates composed mainly of carbon. The particulates, when released into the air, cause environmental pollution. Therefore, there are already developed techniques for fitting, into the exhaust gas system of diesel engine, a particulate-trapping unit containing a filter for particulate capturing, to remove the particulates in exhaust gas before their release into the air.

In using the particulate-trapping unit, the captured particulates accumulate increasingly in the filter, which causes an increase in back pressure and a subsequent reduction in engine performance. In order to prevent this phenomenon, the filter is subjected to a treatment such as backwash, combustion or the like at a timing when the particulates have accumulated to a certain level or while the filter is being used, to remove the particulates and regenerate the filter activity, continuously.

The method for removing the particulates by backwash, however, has a problem that the whole system associated becomes complicated and large. Meanwhile, the method for removing the particulates by combustion has also had the following problem. That is, part of the particulates remains as an ash in the filter after the filter regeneration by combustion; the ash is accumulated in the filter by repeated or long-term regeneration treatment by combustion and reacts with the filter material at high temperatures appearing in the subsequent use or regeneration treatment by combustion, of the filter; as a result, the filter undergoes melting at temperatures lower than the melting point of the filter material.

The above problem has specifically been as follows: the particulates accumulated in the filter contain the P, S, Ca, Na, Zn, Cr, Fe, Ni, Cu, etc. originating from fuels, engine oils, pipes, etc.; compounds and/or composites containing the above elements remain as an ash in the filter even after the combustion of the filter; and this ash causes the filter melting mentioned above. In particular, in the case of a filter made of an oxide ceramic material, it reacts with the above ash easily, which is a serious problem.

Under such a situation, for example, JP-A-10-33923 proposes a technique of using a filter having a ceramic particles layer formed thereon in such a state that the ceramic particles layer is easily peeled, wherein the ash accumulated on the ceramic particles layer is peeled and removed together with the ceramic particles layer by, for example, the pressure of exhaust gas.

Also, National Publication of International Patent Application No. 6-506138 discloses a technique of using a filter having a film on the surface of each filter passage, to prevent the penetration of a material to be filtered, into the pores of the filter and make easy the backwash of the filter.

Further, Japanese Patent No. 2926187 discloses a gas filter for ceramic comprising a filter substrate and a filter layer strongly bonded to at least the filtration side surface, wherein the pore diameters of the filter substrate and the filter layer are controlled to increase the bonding strength of the filter layer.

Furthermore, JP-A-6-198148 discloses a technique of, in the method for producing an inorganic porous film comprising a porous substrate and a thin layer composed of inorganic fine particles, formed on the porous substrate, controlling the average pore diameter and maximum pore diameter of the porous substrate and the thickness of the thin film to prevent the generation of pinholes and cracks.

Also, JP-B-3-42936 discloses a catalyst for purification of exhaust gas, used for selective reduction of particulate matter in diesel engine exhaust gas containing $So_2$, which catalyst comprises a refractive three-dimensional structure having a gas-filtrability and a porous inorganic layer formed on the structure, having a vanadium oxide and a noble metal loaded thereon in a dispersed state.

However, in the technique described in JP-A-10-33923, the ceramic particles layer is formed on the filter in such a state that the ceramic particles layer is peeled from the filter surface by a relatively weak force such as exhaust gas pressure or the like, and the ceramic particles layer is peeled by an exhaust gas current even when no ash is accumulated on the ceramic particles. Therefore, it is necessary to keep on feeding the ceramic particles. As a result, the ceramic particles accumulate in the filter quickly, incurring a decrease in filtration area and an increase in pressure loss; therefore, removal of ceramic particles by backwash or the like must be conducted frequently, which significantly reduces the practical utility of the technique and moreover makes indispensable a large backwash system or a ceramic particles-feeding system. Further in the technique, no investigation is made on the affinity between the ceramic particles and the ash.

In the technique disclosed in National Publication of International Patent Application No. 6-506138, it is a prerequisite to subject the accumulated particulates to backwash to regenerate the filter, and the film formed on each filter passage merely prevents the physical penetration of particulates into the pores of the porous material constituting the filter. No investigation is made on the problem caused by the accumulation of the ash generated upon combustion of particulates. No investigation is made, either, on the affinity between the particulates and the film.

Also in the gas filter for ceramic, described in Japanese Patent No. 2926187, it is a prerequisite to subject the accumulated particulates to backwash to remove them. No investigation is made on the problem caused by the accumulation of the ash generated upon combustion of accumulated particulates. In the gas filter, it is preferred to form the filter layer, for example, in such a manner that a material for filter layer is rubbed into the surface of the filter substrate in such a thickness as part of the filter substrate surface is exposed. With such a filter layer, however, it is impossible to avoid the direct contact between the accumulated material and the filter substrate; therefore, the filter is unsuitable as a filter regeneratable by combustion of accumulated particles.

As to the technique disclosed in JP-A-6-198148, the Examples of the literature show one level for the binder amount used in production of a porous thin film. However, since use in diesel exhaust gas is not the prerequisite for the porous thin film, it is not considered in the technique to control the bonding strength of the thin layer so that the thin layer can withstand exhaust gas heat, vibration and, depending upon the case, backwash. Further, no investigation is made on the problem caused by ash accumulation inherent in use in diesel exhaust gas; therefore, no disclosure is made on the affinity between the ash and the thin layer.

In the catalyst for exhaust gas purification, disclosed in JP-B-3-42936, a catalyst substance is loaded on the porous inorganic layer in order to burn and remove the particulates accumulated on in the filter. Therefore, the porous inorganic layer is appropriately designed as a base for loading a catalyst thereon. However, no consideration is made on the affinity between the layer and the ash remaining after combustion of particulates.

The present invention has been made in view of the above situation and aims at providing a ceramic-made filter regeneratable by combustion and removal of captured particulates, wherein the melting of the filter caused by the ash remaining and accumulating on the filter after the particles captured by the filter have been burnt, can be prevented easily without using a large system or the like.

DISCLOSURE OF THE INVENTION

According to the present invention, there is provided a ceramic-made filter for capturing the particulates present in the exhaust gas discharged from diesel engines, wherein a ceramic particles layer made of heat-resistant ceramic particles is formed on a filter by coating so as to substantially avoid the direct contact between the filter and the ash remaining and accumulating after the particulates captured by the filter have been burnt, the heat-resistant ceramic particles having a BET specific surface area of 300 $m^2/g$ or less.

According to the present invention, there is also provided a process for producing a ceramic-made filter, which comprises coating, on the surface of a filter material made of a porous ceramic, a slurry containing at least heat-resistant ceramic particles having a BET specific surface area of 300 $m^2/g$ or less and a binder at proportions satisfying the following formula, to form a ceramic particles layer:

amount of binder solid (calculated as oxide)/[weight of heat-resistant ceramic particles+amount of binder solid (calculated as oxide)]≧0.02

BEST MODE FOR CARRYING OUT THE INVENTION

Figure 1:
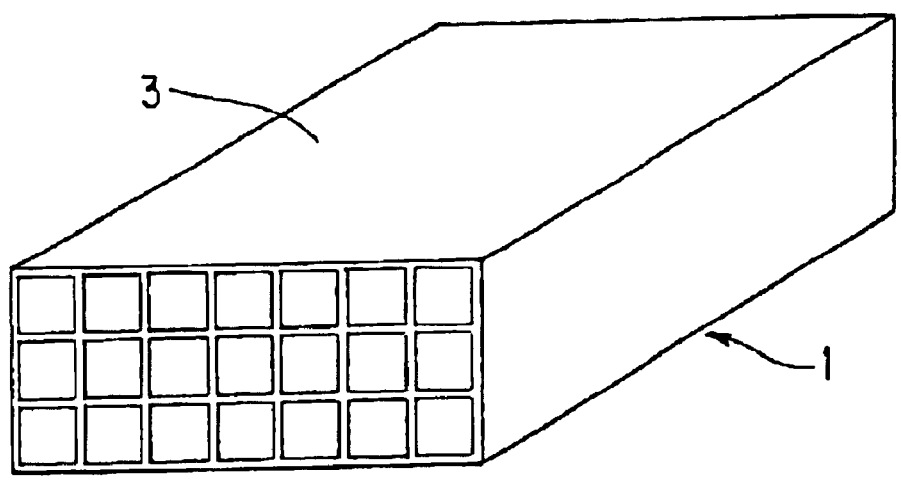
FIG. 1 is a perspective view showing the honeycomb section used in Examples.

In the ceramic-made filter of the present invention, a ceramic particles layer is formed on a filter; thereby, the direct contact between the filter and the ash remaining and accumulating after the particulates captured by the filter have been burnt, is substantially avoided, and the melting of the filter caused by the reaction and/or penetration at high temperatures between the ash and the filter material is prevented.

The ash, when adhering onto the ceramic particles layer, does not give a large increase in pressure loss, as compared with when adhering onto the filter; therefore, the adhesion onto the ceramic particles layer may be continued. However, for the purposes of, for example, lowering the contact between the ash and the filter and enhancing the safety of the filter, or removing, as necessary, the ash out of the filter, or minimizing the pressure loss increase, it is preferred to set low the affinity between the ash and the heat-resistant ceramic particles for easy peeling of the ash from the ceramic particulates layer.

Hence, in the present invention, the heat-resistant ceramic particles constituting the ceramic particles layer have been allowed to have a BET specific surface area of 300 $m^2/g$ or less. By forming a ceramic particles layer using such heat-resistant ceramic particles, the affinity of the heat-resistant ceramic particles to the ash is made low and even an ash having a strong bonding force can be removed from the surfaces of the ceramic particles relatively easily by backwash or the like.

The BET specific surface area of the heat-resistant ceramic particles is preferably 220 $m^2/g$ or less when the ash contains an alkali metal(s) and/or an alkaline earth metal(s) (these metals are generally believed to penetrate into a ceramic material easily) in a total amount of 5% by weight or more in terms of oxide(s); and is more preferably 170 $m^2/g$ or less when the ash contains the metal(s) in a total amount of 10% by weight or more. When the BET specific surface area of the heat-resistant ceramic particles is 100 $m^2/g$ or less, the affinity of the heat-resistant ceramic particles to the ash can be controlled low regardless of the composition of the ash.

When the present ceramic-made filter is used for treatment of the exhaust gas discharged from diesel engines, the heat-resistant ceramic particles are preferred to be stable to long-hour exposure to the heat of exhaust gas. Specifically, the heat-resistant ceramic particles are preferred to show a decrease in BET specific surface area, of 30% or less after the particles have been subjected to a heat treatment of 1,000° C. and 50 hours in a powder state before coating, and a decrease in BET specific surface area, of 50% or less even after a heat treatment of 1,100° C. and 50 hours.

Meanwhile, the lower limit of the BET specific surface area of the heat-resistant ceramic particles is preferred to be 2 $m^2/g$ or more. When the BET specific surface area is less than 2 $m^2/g$, the heat-resistant ceramic particles have poor affinity with the filter body, which may incur the peeling of the ceramic particles layer under an exhaust gas current. A BET specific surface area of 5 $m^2/g$ or more is more preferred because the ceramic particles layer can withstand vibration and backwash.

As mentioned previously, the ceramic particles layer of the present invention use heat-resistant ceramic particles having low affinity with the ash. Therefore, the ash which has adhered onto the ceramic particles layer, can be peeled from the particles layer relatively easily and it is not necessary to remove the ash by peeling the ash from the filter surface together with the ceramic particles, as done in the prior art described in JP-A-10-33923.

Peeling of the ash together with the ceramic particles, as done in the above-mentioned prior art results in undesired accumulation of the peeled ceramic particles on the filter. Therefore, it is preferred to make the ceramic particles adhere strongly onto the filter surface. Thereby, the peeling of the ceramic particles can be minimized, the intervals of removal of accumulated ash can be extended, and a filter of higher utility in practical application can be obtained.

Hence, in contrast to the technique described in JP-A-10-33923 wherein a ceramic particles layer is weakly bonded to a filter so as to allow easy peeling of the layer from the filter surface, in the present invention, a ceramic particles layer is strongly bonded to a filter in order to minimize the peeling of heat-resistant ceramic particles from the filter surface. To achieve this specifically, there is used, in formation of a ceramic particles layer on a filter material, a slurry containing at least heat-resistant ceramic particles having a BET specific surface area of 300 $m^2/g$ or less and a binder at proportions satisfying the following formula:

amount of binder solid (calculated as oxide)/[weight of heat-resistant ceramic particles+amount of binder solid (calculated as oxide)]≧0.02

Here, the "amount of binder solid (calculated as oxide)" refers to the weight of a solid ordinarily in an oxide state, remaining after the binder has been subjected to a heat treatment (drying and/or firing) in the air. For example, when an alumina sol is used as the binder, the amount of binder solid (calculated as oxide) refers to the weight of $Al_2O_3$ which is formed from the heat treatment of the alumina sol; when a silica sol is used, the amount of binder solid (calculated as oxide) refers to the weight of $SiO_2$ which is formed from the heat treatment of the silica sol.

When there is used, in formation of a ceramic particles layer, a slurry containing at least heat-resistant ceramic particles and a binder at proportions satisfying the above formula, there is obtained a bonding strength necessary for preventing the peeling of the heat-resistant ceramic particles under the practical use conditions of being exposed to an exhaust gas current for long hours. Use of, in formation of a ceramic particles layer, a slurry containing at least heat-resistant ceramic particles having a BET specific surface area of 300 m²/g or less and a binder at proportions satisfying the following formula, is preferred because the bonding strength of the obtained ceramic particles layer to the filter body is even higher and the ceramic particles layer can withstand the vibration of engine and the backwash of the ash:

amount of binder solid (calculated as oxide)/[weight of heat-resistant ceramic particles+amount of binder solid (calculated as oxide)]≧0.05

When the amount of binder solid (calculated as oxide) to the total amount of heat-resistant ceramic particles and binder solid content (calculated as oxide) is more than 25% by weight, the ceramic particles layer per se is excessively dense, resulting in a striking increase in pressure loss. In view of this matter, it is more preferred to use, in formation of a ceramic particles layer, a slurry containing at least heat-resistant ceramic particles having a BET specific surface area of 300 m²/g or less and a binder at proportions satisfying the following formula. In practical production of a slurry, it is possible to add, as necessary, an acid, water, etc. in addition to the heat-resistant ceramic particles and the binder, for the required coatability, etc.

0.25≧Amount of binder solid (calculated as oxide)/[weight of heat-resistant ceramic particles+amount of binder solid (calculated as oxide)]≧0.05

The heat-resistant ceramic particles have an average particle diameter of preferably 20 μm or less so that they are resistant to peeling from the filter body under the practical use conditions of being exposed to an exhaust gas current for long hours. The average particle diameter is more preferably 10 μm or less because, with such an average particle diameter, a bonding strength durable to backwash is obtained. Meanwhile, from the standpoint of the low affinity with the ash, the heat-resistant ceramic particles have an average particle diameter of preferably 2 μm or more.

In order to allow the present filter to have high heat resistance, the heat-resistant ceramic particles are preferably composed of a material having a melting point equal to or higher than that of the filter material. The absolute value of the melting point is preferably 1,000° C. or more, more preferably 1,200° C. or more in view of the temperature to which the present filter may be exposed during its regeneration by combustion and removal of accumulated particulates. As specific examples of the material, there are mentioned alumina, silica, zirconia, titania, magnesia, and their compound oxides typified by spinel and mullite.

In order to have low affinity with the ash, the heat-resistant ceramic particles contain Si preferably in an amount of 10% by weight or less in terms of oxide, and more preferably they are substantially free from Si. Therefore, of the above specific examples, preferably used are alumina, zirconia, titania, magnesia and their compound oxides. Alumina and zirconia are particularly preferred for the low affinity; and of alumina, α-alumina is preferred because it shows the lowest affinity. When the heat-resistant ceramic particles contain Si, there are preferred high-silica zeolite and cristobalite, both having a stable crystal structure.

Also, in order to have low affinity with the ash, the heat-resistant ceramic particles contain an alkali metal(s) in a total amount of preferably 1% by weight or less in terms of oxide(s), more preferably 0.5% by weight or less. Similarly, the binder used in the slurry to be coated contains an alkali metal(s) in a total amount of preferably 5% by weight or less in terms of oxide(s), more preferably 2% by weight or less relative to the binder solid content in terms of oxide. Incidentally, the heat-resistant ceramic particles may be used in appropriate combination of two or more kinds.

As to the form of the filter, most preferably used as a diesel particulate filter (DPF) is, from the standpoints of the strength, durability, heat resistance, etc., a filter which has a honeycomb structure constituted by a large number of passages (cells) divided by thin partition walls (cell walls) and wherein each cell of the honeycomb structure is sealed at either of the inlet and outlet ends of the honeycomb structure and, at each end of the honeycomb structure, each sealed cell end is surrounded by unsealed cell ends via cell walls. The present invention is also applicable to a filter of foam form or fiber form.

In the above-mentioned filter having a honeycomb structure wherein, at each end of the honeycomb structure, each sealed cell end is surrounded by unsealed cell ends via cell walls, the ceramic particles layer may be formed, by coating, on both of the cells unsealed at the inlet end and the cells unsealed at the outlet end. However, since the ash is accumulated on the former cells, formation of the ceramic particles layer only on the former cells is preferred in order to minimize the increase in pressure loss caused by the formation of the ceramic particles layer.

As to the formation of the ceramic particles layer by coating, the aim of the present invention is achieved as long as the filter surface is substantially covered with the ceramic particles layer. The thickness of the ceramic particles layer is preferably 2 to 100 μm, more preferably 5 to 50 μm at the middle of each cell wall (the thickness is generally smallest at this site). When the thickness of the ceramic particles layer is less than 2 μm, the direct contact between the ash and the filter cannot be prevented sufficiently; when the thickness is more than 100 μm, pressure loss becomes larger than the allowable range; therefore, such thicknesses are not preferred.

The partition walls which divide cells, have a thickness of preferably 50 to 500 μm. When the thickness of each partition wall is less than 50 μm, filter resistance to melting is low viewed from the strength standpoint and also from the heat mass standpoint; meanwhile, when the thickness is more than 500 μm, pressure loss increase is striking; therefore, such thicknesses are not preferred.

The heat-resistant ceramic particles constituting the ceramic particles layer are loaded in an amount of preferably 5 to 250 g/l of honeycomb volume, more preferably 10 to 150 g/l of honeycomb volume. When the heat-resistant ceramic particles are loaded in an amount of less than 5 g/l of honeycomb volume, the particles are unable to cover the filter surface sufficiently; when the amount is more than 250 g/l of honeycomb volume, the risk of cell plugging may increase and pressure loss becomes larger than the allowable range; therefore, such loading amounts are not preferred.

In the case that the filter form is a honeycomb structure wherein the shape of cells sealed and unsealed cells shows a checkered pattern, when the ceramic particles layer is formed, by coating, only on the cells unsealed at the inlet end among those at the inlet end and those at the outlet end, the appropriate loading amounts of the heat-resistant ceramic particles are each ½ of the above-mentioned amounts.

In order to coat an appropriate amount of the heat-resistant ceramic particles homogeneously, the honeycomb structure has a cell density of preferably 500 cells/in.$^2$ (78 cells/cm$^2$) or less. From the standpoint of filter efficiency, the cell density is preferably 50 cells/in.$^2$ (7.8 cells/cm$^2$) or more.

The filter of the present invention preferably has a high thermal impact resistance because it is mounted on the exhaust gas system of diesel engine. Specifically, the filter material per se has a thermal expansion coefficient of preferably $2 \times 10^{-6}/°$ C. or less and the filter after coating has a thermal expansion coefficient of preferably $5 \times 10^{-6}/°$ C. or less.

The present invention is effective to various filter materials such as cordierite, silicon carbide, zirconyl phosphate, alumina, mullite, spinel and the like, and there is no particular restriction as to the filter material used in the present invention. However, the present invention is particularly effective to cordierite having a relatively low melting point.

The present invention aims at preventing the melting of filter caused by the reaction and/or penetration at high temperatures between the ash and the filter material. Exposure of filter to high temperatures occurs during the use of the filter and also during the combustion and removal of the particulates accumulated on the filter. The present invention is effective to a system of heater and/or catalytic combustion type including the later mode where a higher temperature is predicted. The present invention is very effective particularly to a system capable of allowing the particulates accumulated to a certain level, to burn at one time using a heater or the like. The present invention is not clearly effective to a system of removing the particulates captured by the filter and accumulated thereon, by backwash and not by combustion, because the amount of ash accumulated is small and no combustion heat is generated. However, even in the system of heater and/or catalytic combustion type, the ash remaining and accumulating after the combustion of particulates may preferably be removed by backwash.

When the system is a catalytic combustion type, the catalyst component is disposed upstream of the filter as an independent member in some cases but, in many cases, is disposed on the filter material.

In the latter case, the heat-resistant ceramic particles and the catalyst component may be mixed and coated on the filter material, or they may be independently coated so as to form respective layers. For example, coating of heat-resistant ceramic particles on a filter material and subsequent coating of a catalyst component thereon is a preferred embodiment. As the catalyst component, a metal catalyst may be used per se; however, it is ordinarily used by being loaded on a heat-resist inorganic oxide having a high specific surface area, for achieving high dispersion.

As described previously, the filter of the present invention can be produced by coating, on a porous ceramic-made filter material, a slurry containing at least heat-resistant ceramic particles having a BET specific surface area of 300 m$^2$/g or less and a binder at proportions satisfying the following formula, to form a ceramic particles layer:

amount of binder solid (calculated as oxide)/[weight of heat-resistant ceramic particles+amount of binder solid (calculated as oxide)]≧0.02

In the above production process, the requirements for the filter, heat-resistant ceramic particles, binder, slurry, ceramic particles layer, etc. are as mentioned above. The heat treatment temperature employed after the coating of the slurry is preferably 200° C. or higher in order to allow the heat-resistant ceramic particles to have a sufficient bonding strength. The heat treatment temperature is preferably 700° C. or lower because a heat treatment temperature of higher than 700° C. gives a large thermal load.

The present invention is described in more detail below by way of Examples. However, the present invention is in no way restricted to these Examples.

EXAMPLES 1 TO 8 AND COMPARATIVE EXAMPLES 1 TO 2

A honeycomb piece 1 such as shown in FIG. 1 was cut out from the two ends-excluded portion of a cordierite DPF made of NGK INSULATORS, LTD. [partition wall thickness: 17 mil (430 μm), cell density: 100 cells/in.$^2$ (15.5 cells/cm$^2$)] which had a honeycomb structure and wherein each cell of the honeycomb structure was sealed at either of the inlet and outlet ends of the honeycomb structure and, at each end of the honeycomb structure, each sealed cell end was surrounded by unsealed cell ends via cell walls.

To each of various ceramic particles shown in Table 1 was added an alumina sol in an amount of 10% by weight or 1% by weight based on the total, in terms of $Al_2O_3$ originating from the sol. Thereto was added an appropriate amount of water to obtain various ceramic particles slurry for coating. Each slurry was wash-coated on the honeycomb piece 1 (one kind of slurry was coated on four honeycomb sections) and then fired at 600° C. for 1 hour to obtain various honeycomb sections having a ceramic particles layer bonded thereto (hereinafter, these honeycomb sections are each referred to as "coated honeycomb section"). The amount of the ceramic particles layer loaded was controlled by the slurry concentration, the times of wash-coating, etc. so that the thickness of the ceramic particles layer became 40 μm or 5 μm on an average at the middle of each cell wall. In some of the coated honeycomb sections, a catalyst layer composed of Pd, γ-$Al_2O_3$ and $CeO_2$ was formed on the ceramic particles layer. Also, ceramic particles-non-coated honeycomb sections were prepared for comparison (Comparative Example 2).

In order to simulate a state in which Ca was accumulated on a DPF (Ca is one of the major components of an ash which accumulates in DPF, and is generally known to penetrate into a ceramic material easily), a CaO powder (a commercial reagent) was uniformly accumulated on the upper surface (test surface) 3 of each coated honeycomb section and each comparative honeycomb section. The resulting honeycomb sections were each used as a test piece. The amount of the CaO powder accumulated was 0.03 g/cm$^2$ (0.18 g/cm$^2$ in whole test surface).

Each test piece was aged for 1 hour in an electric furnace. The temperature of the aging consisted of four levels of 1,100° C., 1,200° C., 1,300° C. and 1,400° C. One test piece was used for one level. After the completion of the aging, the degree of melting of each test piece was examined by appearance. In the examination, a case when there was no reaction between the coated honeycomb section or the comparative honeycomb section and the CaO powder accumulated, was rated as "A"; a case when a reaction was seen partially but it was slight, was rated as "B"; a case when a reaction was seen and a hole(s) generated in the test surface, was rated as "C"; and a case when a reaction was seen and the test surface melted and broken off, was rated as "D". The results of rating are shown in Table 1.

TABLE 1

| | Added amount of binder *1 | Ceramic particles | | | | Catalyst layer | Degree of melting | | | |
|---|---|---|---|---|---|---|---|---|---|---|
| | | Kind | BET Specific Surface area | Average particle diameter | Alkali Metal content *2 | Particles layer thickness | | 1,100° C. | 1,200° C. | 1,300° C. | 1,400° C. |
| | (wt. %) | | ($m^2/g$) | ($\mu m$) | (wt. %) | *3 ($\mu m$) | | | | | |
| Ex. 1 | 10 | γ-Alumina | 150 | 5 | 0.2 | 40 | No | A | A | B | C |
| Ex. 2 | 10 | α-Alumina | 10 | 5 | 0.2 | 40 | No | A | A | A | B |
| Ex. 3 | 10 | Zirconia | 5 | 30 | 0.2 | 40 | No | A | A | A | C |
| Ex. 4 | 10 | γ-Alumina | 150 | 1 | 0.2 | 40 | No | A | B | C | D |
| Ex. 5 | 10 | α-Alumina | 10 | 30 | 0.2 | 40 | No | A | A | A | C |
| Ex. 6 | 10 | γ-Alumina | 150 | 5 | 1.5 | 40 | No | A | C | D | D |
| Ex. 7 | 10 | γ-Alumina | 150 | 5 | 0.2 | 5 | No | A | C | C | D |
| Comp. Ex. 8 | 10 | γ-Alumina | 150 | 5 | 0.2 | 40 | Yes | A | A | A | B |
| Comp. Ex. 1 | 1 | γ-Alumina | 150 | 5 | 0.2 | 40 | No | A | A | B | C |
| Comp. Ex. 2 | — | — | — | — | — | — | No | B | D | D | D |

*1: Expressed as $Al_2O_3$ remaining after firing.
*2: Calculated as oxide.
*3: Measured at the middle between intersections.

For Example 1 and Comparative Example 1, to the test surface of each test piece after aging at 1,100° C. was applied an air of 2 kgf/cm², and the weights of the test piece before and after the air application were measured. From the resulting weight decrease and the appearance of the test piece, the condition of peeling of the ceramic particles layer was predicted. The results are shown in Table 2.

TABLE 2

| | Added Amount of | Condition of peeling by air application after aging of 1,100° C. × 1 hr | |
|---|---|---|---|
| | Binder *1 (wt .%) | Weight decrease*2 (g) | Appearance |
| Ex. 1 | 10 | 0.17 | The CaO powder accumulated was blown off and the ceramic particles layer remained. |
| Comp. Ex. 1 | 1 | 0.26 | The ceramic particles layer was peeled off, and the test surface was naked. |

*1: Expressed as $Al_2O_3$ remaining after firing.
*2: (Weight before air application) − (weight after air application).

Industrial Application

As described above, the present invention can easily prevent the melting of filter caused by the reaction of the ash remaining and accumulating after the particulates captured by the filter have been burnt, with the material of the filter, without using a large system or the like.

What is claimed is:

1. A ceramic-made filter for capturing particulates present in exhaust gas discharged from diesel engines, wherein a ceramic particles layer made of heat-resistant ceramic particles is formed on a filter by coating so as to substantially avoid direct contact between the filter and ash remaining and accumulating after the particulates captured by the filter have been burnt, the heat-resistant ceramic particles having a BET specific surface area of 300 $m^2/g$ or less and wherein the heat-resistant ceramic particles have an average particle diameter of 2 to 20 $\mu m$.

2. A ceramic-made filter according to claim 1, wherein the BET specific surface area of the heat-resistant ceramic particles is 5 to 100 $m^2/g$.

3. A ceramic-made filter according to claim 1, wherein the heat-resistant ceramic particles are made of at least one kind of ceramic material selected from the group consisting of alumina, silica, zirconia, titania, magnesia and a compound oxide thereof.

4. A ceramic-made filter according to claim 1, wherein the heat-resistant ceramic particles contain Si in an amount of 10% by weight or less in terms of oxide.

5. A ceramic-made filter according to claim 1, wherein the heat-resistant ceramic particles contain an alkali metal in an amount of 1% by weight or less in terms of oxide.

6. A ceramic-made filter according to claim 1, which has a honeycomb structure and wherein each cell of the honeycomb structure is sealed at either of the inlet and outlet ends of the honeycomb structure and, at each end of the honeycomb structure, each sealed cell end is surrounded by unsealed cell ends via cell walls.

7. A ceramic-made filter according to claim 1, wherein the ceramic particles layer has a thickness of 2 to 100 $\mu m$.

8. A ceramic-made filter according to claim 6, wherein the cell walls forming each cell have a thickness of 50 to 500 $\mu m$.

9. A ceramic-made filter according to claim 6, wherein the heat-resistance ceramic particles constituting the ceramic particles layer are loaded in an amount of 5 to 250 g/l of honeycomb volume.

10. A ceramic-made filter according to claim 6, wherein the honeycomb structure has a cell density of 50 to 500 cells/in.² (7.8 to 78 cells/cm²).

11. A ceramic-made filter according to claim 1, which is made of cordierite.

12. A ceramic-made filter according to claim 1, wherein a catalyst component is mixed into the ceramic particles layer.

13. A ceramic-made filter according to claim 1, wherein a catalyst component is coated on the ceramic particles layer.

14. A process for producing a ceramic-made filter, which comprises coating, on the surface of a filter material made of a porous ceramic, a slurry containing at least heat-resistant ceramic particles having (1) a BET specific surface area of 300 m$^2$/g or less and (2) an average particle diameter of 2 to 20 µm and a binder at proportions satisfying the following formula, to form a ceramic particles layer:

amount of binder solid (calculated as oxide) /[weight of heat-resistant ceramic particles +amount of binder solid (calculated as oxide)]≧0.02.

15. A process for producing a ceramic-made filter according to claim 14, wherein the slurry contains at least heat-resistant ceramic particles having a SET specific surface area of 300 m$^2$/g or less and a binder at proportions satisfying the following formula:

0.25≧amount of binder solid (calculated as oxide)/[weight of heat-resistant ceramic particles+amount of binder solid (calculated as oxide)]≧0.05.

16. A process for producing a ceramic-made filter according to claim 14, wherein the binder contains an alkali metal in an amount of 5% by weight or less in terms of oxide, relative to the binder solid in terms of oxide.

17. In a method of using a ceramic-made filter in a system wherein particulates captured on said filter are burnt and removed by a heater or a catalytic reaction, the improvement comprising using as said ceramic-made filter a ceramic-made filter according to claim 1.

18. A ceramic-made filter according to claim 1, wherein the heat resistant ceramic particles and a binder for the ceramic particles satisfy the following formula:

0.25≧amount of binder solid (calculated as oxide)/[weight of heat-resistant ceramic particle+amount of binder solid (calculated as oxide)].

* * * * *